United States Patent Office 3,097,244
Patented July 9, 1963

3,097,244
PRODUCTION OF VITAMIN A ALDEHYDE
Howard C. Klein, Brooklyn, N.Y., and Davide R. Grassetti, Richmond, Calif., assignors to Nopco Chemical Company, Harrison, N.J., a corporation of New Jersey
No Drawing. Filed Sept. 4, 1957, Ser. No. 681,898
9 Claims. (Cl. 260—598)

This invention relates to the preparation of vitamin A and more specifically, relates to the preparation of intermediate compounds which can be employed in the preparation of vitamin A.

The synthesis of vitamin A has engaged the attention of the art since the structure of vitamin A was first disclosed by Karrer in 1933. Many routes for the synthesis of vitamin A have been advanced and a considerable body of literature has been developed concerning the preparation of vitamin A, vitamin A active materials and vitamin A intermediates. Because of the demand for vitamin A and the market which exists for this compound, efforts are constantly being made to devise new and improved methods both for the total synthesis of vitamin A and for the preparation of intermediate compounds which can be employed in the production of vitamin A.

Accordingly it is an object of the present invention to provide an improved method for obtaining vitamin A.

It is a more particular object to provide a novel and effective method for the production of valuable intermediates useful in the production of vitamin A.

It is a further object to provide a method for obtaining vitamin A aldehyde is increased yield and free from the presence of anhydro vitamin A and other contaminants.

Further objects will become apparent from the detailed description given hereinafter. It is intended however, that the detailed description and the specific examples do not limit the invention, but merely indicate the preferred embodiments thereof since various changes and modifications within the scope of the invention will become apparent to those skilled in the art.

It has been discovered that the above and other objects can be achieved by directly a quaternary salt of a vitamin A active organic amine with iodine.

These quaternary salts are described and claimed, along with a process for obtaining them, in U.S. patent application Serial No. 681,899, and now Patent No. 2,945,876, of Klein, filed concurrently with this application. As described therein, these salts may be prepared by treating a vitamin A active organic amine with a quaternizing agent such as methyl iodide at low temperatures in the presence of a solvent inert to the aforesaid reactants. Crystals of the quaternary salts readily form and may be collected and purified by washing with non-polar organic solvents such as dimethyl ether, diethyl ether, hexane, pentane, etc., in which solvents the polar quaternary salts are highly insoluble. In this manner, very pure quaternary salts are obtained since unreacted vitamin A active organic amine, excess quaternizing agent, or other impurities that arise during the quaternization process remain in solution in the non-polar organic solvent. Alternatively, the quaternary salts may be purified by rapid recrystallization from acetonitrile.

The preparation of the vitamin A active organic amine is described in U.S. Patent No. 2,819,310, Klein, Beckmann and Schaaf, and U.S. Patent No. 2,819,308, Schaaf, Klein and Kapp, both issued on January 7, 1958. This vitamin A organic amine is hereinafter referred to as Compound IV. In brief, either the cis or trans form of a material having the empirical formula $C_{20}H_{30}O$ and the structural formula

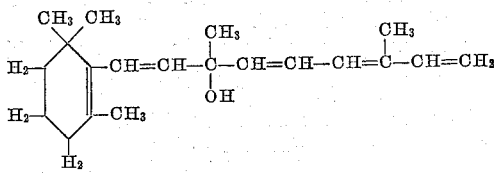

which compound contains the beta ionone ring structure, four ethylenic bonds and one hydroxyl group and which in the trans configuration has an absorption maximum in the ultra-violet at 2710 A., a molecular extinction coefficient thereat of 29,100 and has a $[n]_D^{20}=1.552$ and which in the cis configuration has an absorption maximum in the ultra-violet at 2740 A., a molecular extinction coefficient thereat of 25,900 and has a $$[n]_D^{16}=1.535$$

(referred to hereinafter as Compound I) is reacted with a boron trifluoride hexamethylene tetramine complex under appropriate reaction conditions in a water-containing aromatic hydrocarbon solution or in solution in a solvent selected from the group consisting of acetone, acetonitrile, acrylonitrile, benzyl, cyanide, dioxane, isopropenyl acetate and tetrahydrofuran. Thereafter, the reaction mixture is worked up with an alkaline material. The resulting product which is vitamin A active is referred to hereinafter as Compound IV. Compound IV contains a hexamethylene tetramine fragment in the molecule.

Compound IV when tested biologically on rats shows a vitamin A activity of about 50%. Its utra-violet spectrographic characteristics are practically identical with those of vitamin A; however, infra-red spectrographic analysis shows that Compound IV does not contain a hydroxyl group, but that it does contain an amine group. Analysis of Compound IV by the Kjeldahl method shows that Compound IV has a nitrogen content which is about 9.6% and is about twice the nitrogen content of vitamin A amine. Vitamin A amine has the same structure as vitamin A only the amine group has replaced the hydroxyl group of vitamin A. The 9.6% value is also twice as large as the basic nitrogen value which is obtained by titration of this compound with approximately 0.02 N perchloric acid in glacial acetic acid. This indicates that the molecule contains more than one nitrogen atom and that not all of it is basic. Thus the physical and chemical characteristics of Compound IV indicates that it contains the vitamin A chromophoric system wherein the hydroxyl group of vitamin A has been replaced by a basic fragment similar to a major portion of the hexamethylene tetramine molecule.

Compound IV is a viscous liquid soluble in ethyl ether, ethyl alcohol, acetone and similar solvents. It has an absorption maximum in the ultra-violet region of the spectrum at 3250 A. and has at that wave length an extinction coefficient $$(E_{1\,cm.}^{1\%})$$

of about 1000. If it is treated with hydrobromic acid, a product is obtained which has an absorption maximum at 3300 A. Likewise treatment of Compound IV with phosphoric acid gives a product having an absorption maximum at 3280–3300 A. Presumably salts of Compound IV are formed by treatment with hydrobromic acid and phosphoric acid since treatment of the products with alkali gives in each case the original Compound IV. Acetylation of Compound IV with acetic anhydride gives a product which when analyzed by infra-red analysis shows the presence of an amide band in the infra-red spectrographic curve.

Compound IV can be converted to vitamin A amine by treating it with aluminum isopropoxide in accordance with the procedure disclosed and claimed in U.S. Patent 2,819,309, Klein, issued January 7, 1958. Also, Compound IV can be converted into vitamin A aldehyde by treating it with iodine in accordance with the procedure disclosed and claimed in U.S. Patent 2,819,311, Klein and Grassetti, issued January 7, 1958.

For a fuller understanding of the nature and objects of the present invention, reference may be had to the following examples which are given for the purposes of illustration and are not to be construed in a limiting sense.

*Example I*

87.2 mg. of Compound IV methiodide (a quaternary salt of Compound IV disclosed in U.S. patent application No. 681,899, and now Patent No. 2,945,876, of Klein, filed concurrently herewith) having an ultra-violet absorption maximum at 3310 Å. and an $$E_{1\,cm.}^{1\%} = 840$$

thereat and a purity of 94.4% taking $$E_{1\,cm.}^{1\%} = 890$$

for 100% pure quaternary salt was mixed together with 20 ml. of water, 100 mg. of iodine and 60 ml. of dioxane. The mixture was then refluxed on the steam bath in an atmosphere of nitrogen for one-half hour. At the conclusion of the refluxing period, the resulting reaction mixture was treated with a 5% aqueous sodium thiosulfate solution until the iodine color was discharged. The vitamin A aldehyde was extracted with hexane, and the hexane extracts washed several times with water to remove excess sodium thiosulfate. The extracts were dried over sodium sulfate, followed by filtration and careful evaporation of the hexane, resulting in a quantitative yield of crude vitamin A aldehyde.

To determine the completeness of this reaction with iodine, the product was analyzed spectrographically. The ultra-violet absorption maximum of the starting material, Compound IV methiodide, which was 3310 Å. with an $$E_{1\,cm.}^{1\%} = 840$$

was not present in the reaction product. There was found instead, a smooth vitamin A aldehyde curve free of anhydro vitamin A having the characteristic ultra-violet absorption maximum at 3800 Å. with an $$E_{1\,cm.}^{1\%}$$

thereat of 800. The net yield of vitamin A aldehyde was 57.5%, based on the ultra-violet spectrographic data. A titration with .02 N-perchloric acid indicated the absence of basic material. A Kjeldahl nitrogen analysis indicated contamination to the extent of 3% by a non-basic nitrogenous material, presumably an intermediate of the process that was unconverted to aldehyde.

The product, vitamin A aldehyde, was further characterized by silver oxide oxidation which yielded vitamin A acid and vitamin A alcohol (vitamin A) in the acid and neutral fractions respectively. This procedure for obtaining vitamin A acid and vitamin A alcohol simultaneously is the subject matter of U.S. patent application Serial No. 665,129, Klein, filed June 12, 1957 and now Patent No. 2,907,796. This is accomplished by dissolving 50 mg. of vitamin A aldehyde in 2 cc. of ethanol. This vitamin A aldehyde solution is added to a suspension of silver oxide. The silver oxide suspension is prepared by mixing 0.15 gram of silver nitrate, contained in 0.6 ml. of water, with 0.07 gram of sodium hydroxide contained in 0.6 ml. of water. The mixture of vitamin A aldehyde and silver oxide is then shaken vigorously for two hours, at which time a silver mirror is deposited. Thereafter the reaction mixture is filtered and the solids washed thoroughly with water and fresh ethanol. These washings are added to the filtrate. The filtrate is then diluted with water and extracted with diethyl ether. The alkaline phase which is the aqueous phase and contains the sodium salt of vitamin A acid is acidified with dilute hydrochloric acid and extracted with ether, whereupon, vitamin A acid is obtained. The neutral fraction which is the ether phase contains vitamin A alcohol.

The identity of vitamin A aldehyde was further established by infra-red analysis, and by conversion of the aldehyde to vitamin A alcohol with lithium aluminum hydride, as taught by Wendler et al. J. Am. Chem. Soc. 72, 239 (1950).

The following three examples in which no iodine is used in the conversion to vitamin A aldehyde are included to demonstrate the superiority of iodine as taught in Example I.

*Example II*

Example I was repeated, however iodine was omitted. Upon analysis of the crude product, an ultra-violet absorption maximum was observed at 3700 Å., with an $$E_{1\,cm.}^{1\%}$$

thereat of 880, thus indicating the presence of vitamin A aldehyde. However, the ultra-violet absorption curve, in contradistinction to the smooth ultra-violet absorption curve of Example I, also showed the characteristic shoulders or maxima of anhydro vitamin A. Moreover, the absorption maximum at 3700 Å. was broader (i.e., not nearly as sharply defined) when compared with the 3800 Å. maximum of the smooth ultra-violet absorption curve obtained in Example I. This is indicative of greater amounts of polymer formation in addition to the anhydro vitamin A contaminant. Finally, a titration with 0.02 N perchloric acid on the crude vitamin A aldehyde of Example II indicated the absence of basic materials. A Kjeldahl nitrogen determination was then carried out which indicated 15.89% of a non-basic nitrogen contaminant, presumably an intermediate which was unconverted to aldehyde. Thus, the unique and unexpected function and advantages resulting from the introduction of iodine in Example I, is clearly and unequivocally established.

*Example III*

Example I was again repeated, but this time hexamethylene tetramine was substituted mole for mole for the iodine of Example I. The ultra-violet curve of the product disclosed a principal absorption maximum at 3700 Å. indicating the presence of vitamin A aldehyde. However, this curve also disclosed the same contamination of the product referred to in Example II, i.e., the presence of anhydro vitamin A, non-basic nitrogen contaminants, and polymeric materials.

*Example IV*

The methyl p-toluene sulfonate quaternary salt of Compound IV was prepared in a manner as indicated in Example IV of copending U.S. patent application Serial No. 681,899 and now Patent No. 2,945,876, Klein, filed concurrently herewith. However, only one-fourth as much starting material (Compound IV) was used. The white platelets of the quaternary salt were recovered by filtering off on a Büchner funnel and dissolved in a solution of 3 ml. of water and 10 ml. of dioxane. The solution of the quaternary salt in the water-dioxane mixture was refluxed for 20 minutes. Thereafter the reaction product was worked up with hexane and water. An ultra-violet analysis of the hexane solution showed a smooth aldehyde curve with a $\lambda_{max} = 3728$ Å. However, the curve indicated the presence of polymerization products.

Other quaternary salts of Compound IV may be employed in lieu of the methiodide salt, such as the quaternary salts of the following quaternizing agents: methyl bromide, ethyl bromide, benzyl chloride, methyl p-toluene sulfonate, dimethyl sulfate, etc.

The proportions of iodine may vary from 0.3 to 1.5 parts to one part of quaternary salt. Preferably about 1.17 parts of iodine per part of salt is utilized. It is preferred to bring about treatment of the salt and iodine at reflux temperature which is about 85–90° C. for Example I. 70° C. up to reflux is however satisfactory. It is also preferred to conduct the heating in an inert atmosphere such as nitrogen, to insure the stability of both the quaternary salt and the desired product, which are otherwise susceptible to attrition by air oxidation. The length of time for heating may vary from about fifteen minutes to half an hour. As Example I indicates, one-half hour is sufficient to obtain the aldehyde.

The reaction is carried out in the presence of a solvent which is inert to the reactants e.g. aromatic hydrocarbon solvents such as benzene, toluene, xylene, methyl isopropyl benzene, isopropyl benzene, ethyl benzene, diethyl benzene, mesitylene, butyl benzene, amyl benzene and the more polar solvents such as acetone, ethanol, methanol, acetonitrile, acrylonitrile, benzyl cyanide, isopropenyl acetate and tetrahydrofuran. The preferred solvent system is one which brings about a homogeneous reaction system and the preferred solvent is dioxane containing water.

The solvent is present in an excess, by weight or volume of the reactants. Generally it is preferred that the reaction be carried out in a dilute solution although it is of course obvious that the proportions of reactants to solvent are not critical.

As Example I indicates, 25% by volume of the solvent is water. The quantity of water, however, may vary from about 0.1 ml. to 0.8 ml. per ml. of non-aqueous solvent. This water may be omitted, i.e., the reaction may be carried out in the presence of an inert anhydrous solvent. If this is the case, then the reaction product will require a subsequent treatment with water and this quantity of water may also vary from about 0.1 ml. to 0.8 ml. per ml. of non-aqueous solvent.

Any excess iodine is eliminated from the reaction mixture by adding aqueous sodium thiosulfate thereto in an amount sufficient to discharge the iodine color. The vitamin A aldehyde is then readily recovered from the reaction mixture by any desired means. However, extraction with a water immiscible solvent such as hexane is preferred after further dilution of the reaction mixture with water. This solvent is in turn removed by evaporation. In all instances, a very excellent yield of vitamin A aldehyde, free of anhydro vitamin A is obtained.

As the foregoing demonstrates, a novel process for obtaining vitamin A aldehyde has been described. Vitamin A aldehyde may in turn be converted to vitamin A as described by Wendler et al., supra. Furthermore, high and almost completely quantitative yields of vitamin A aldehyde are obtained. The product is also uncontaminated by the presence of anhydro vitamin A which, of course, has no vitamin A activity and hence is undesirable. Moreover, the iodine, in addition to bringing about the conversion of quaternary salt to aldehyde, serves to isomerize any cis vitamin A aldehyde that may be present to the trans configuration. This is of considerable importance because vitamin A alcohol obtained from the trans isomer of vitamin A aldehyde shows greater biological activity than vitamin A alcohol obtained from cis vitamin A aldehyde or mixtures thereof with the trans isomer.

Finally, as described in U.S. patent application Serial No. 681,899, and now Patent No. 2,945,876, Klein, filed concurrently herewith, use of the quaternary salts of Compound IV allows for a procedure in which the starting material is free from various contaminants such as polymeric materials, unreacted starting material, etc.

It will be appreciated that various modications can be made in the invention described above and such are within the scope of the present invention as defined in the appended claims.

Having described our invention, what we claim as new and desire to secure by Letters Patent is:

1. A process for producing a vitamin A intermediate which comprises heating with iodine in the presence of an inert solvent a quaternary salt of an amine compound which amine compound has (1) vitamin A activity, (2) an absorption maximum in the ultra-violet region of the spectrum at 3250 A. and an extinction coefficient thereat of about 1000, (3) an infra-red pattern having the characteristic amine band, (4) when treated with hydrobromic acid, gives a product having an absorption maximum in the ultra-violet region of the spectrum at 3300 A., (5) when treated with phosphoric acid gives a product having an absorption maximum in the ultra-violet at 3280–3300 A., (6) contains the vitamin A chromophoric system, (7) contains a hexamethylene tetramine fragment, (8) has a Kjeldahl nitrogen content of about 9.6%, (9) when treated with acetic anhydride gives a product which shows an amide band when subject to infra-red analysis, (10) when treated with iodine is converted to vitamin A aldehyde and (11) when treated with aluminum isopropoxide is converted to vitamin A amine.

2. The process of claim 1 in which said solvent is selected from the group consisting of aromatic hydrocarbons, acetone, acetonitrile, acrylonitrile, benzyl cyanide, dioxane, isopropyl acetate and tertahydrofuran.

3. The process of claim 2 in which said solvent is a water-containing solvent.

4. The process of claim 2 in which from 0.3 to 1.5 parts of iodine are reacted with one part of said quaternary salt.

5. The process of claim 4 in which said iodine and quaternary salt are heated at a temperature of from 70° C. to the temperature of reflux.

6. The process of claim 5 in which said heating is carried out for a period of time from about fifteen minutes to half an hour.

7. The process of claim 6 in which said quaternary salt is the methiodide salt.

8. A process for producing vitamin A aldehyde which comprises refluxing for about one-half hour in the presence of an excess of a water-containing inert solvent from about 0.3 to 1.5 parts of iodine per part of quaternary salt of an amine compound which amine compound has (1) vitamin A activity, (2) an absorption maximum in the ultra-violet region of the spectrum at 3250 A. and an extinction coefficient thereat of about 1000, (3) an infra-red pattern having the characteristic amine band, (4) when treated with hydrobromic acid, gives a product having an absorption maximum in the ultra-violet region of the spectrum at 3300 A., (5) when treated with phosphoric acid gives a product having an absorption maximum in the ultra-violet at 3280–3300 A., (6) contains the vitamin A chromophoric system, (7) contains a hexamethylene tetramine fragment, (8) has a Kjeldahl nitrogen content of about 9.6%, (9) when treated with acetic anhydride gives a product which shows an amide band when subject to infra-red analysis, (10) when treated with iodine is converted to vitamin A aldehyde and (11) when treated with aluminum isopropoxide is converted to vitamin A amine.

9. The process of claim 8 in which said quaternary salt is the methiodide salt.

References Cited in the file of this patent

UNITED STATES PATENTS 2,819,311    Klein et al. _____ Jan. 7, 1958